July 22, 1930.    A. B. BLACKWOOD ET AL    1,771,285
SHOCK LOADER
Filed Sept. 14, 1928    4 Sheets-Sheet 2
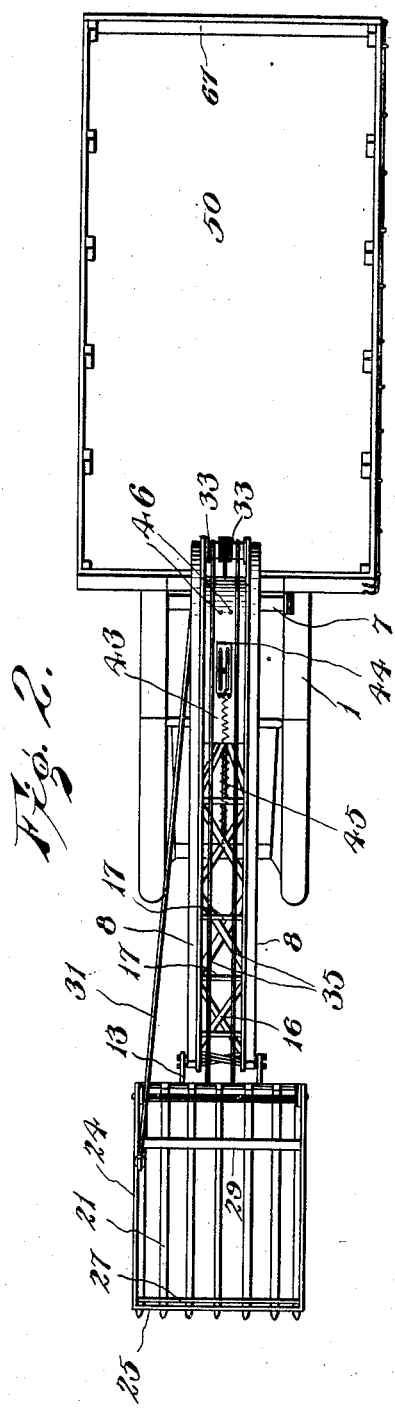
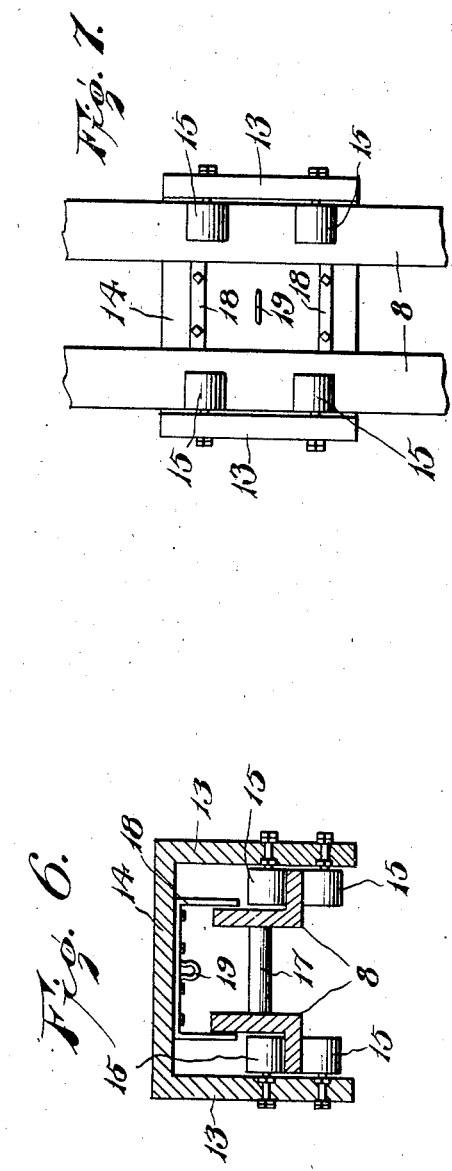
INVENTOR.
A. B. Blackwood
BY  H. J. Harkness
Lacey+Lacey,  ATTORNEY.S July 22, 1930. A. B. BLACKWOOD ET AL 1,771,285
SHOCK LOADER
Filed Sept. 14, 1928 4 Sheets-Sheet 3
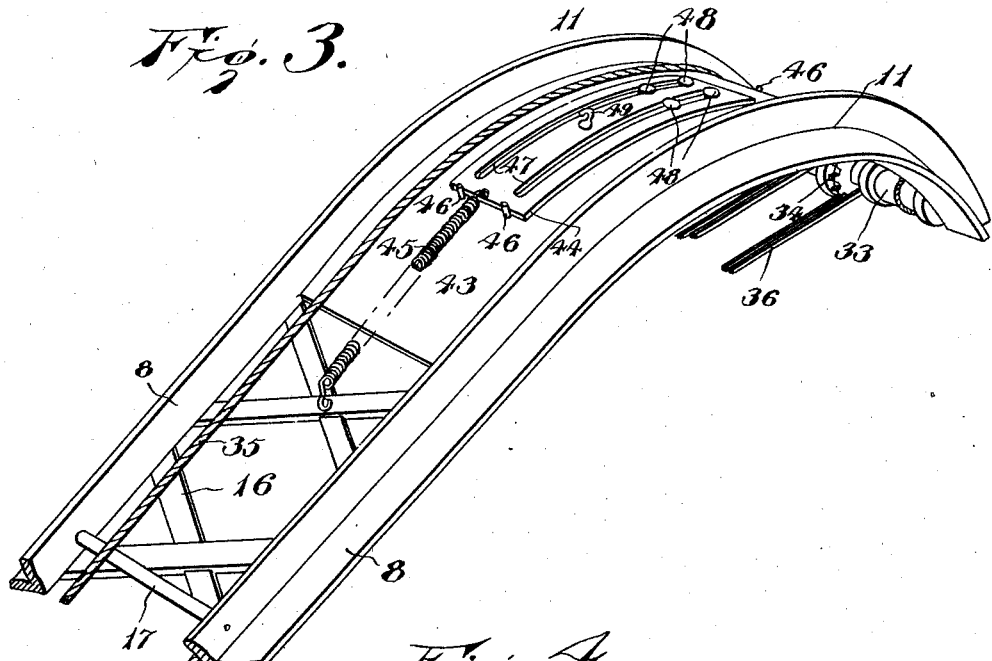
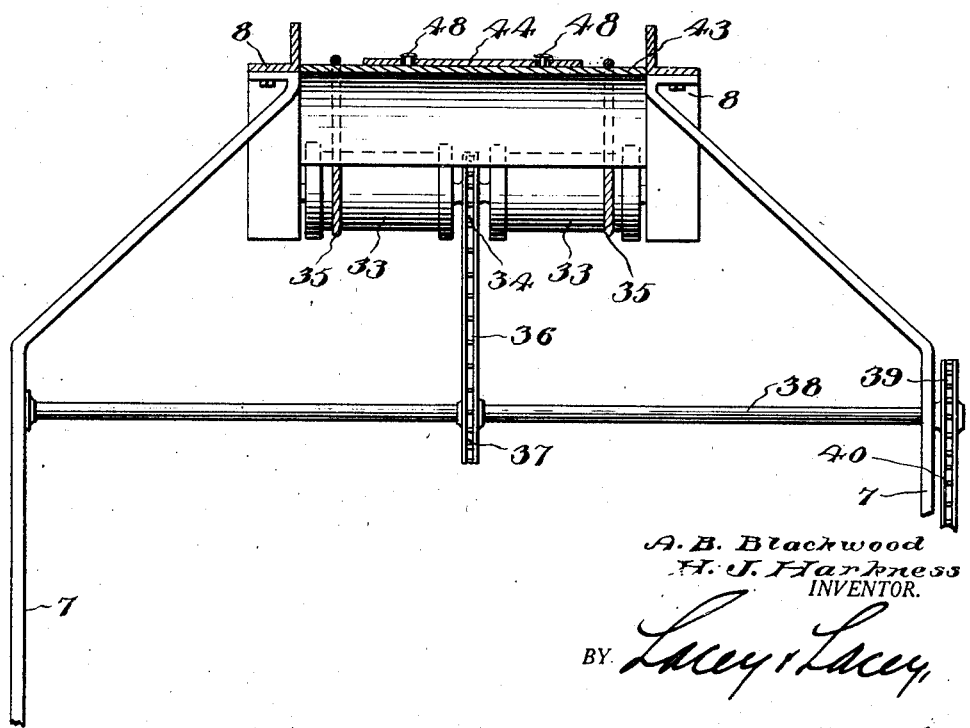
A. B. Blackwood
H. J. Harkness
INVENTOR.
BY Lacey & Lacey
ATTORNEYS

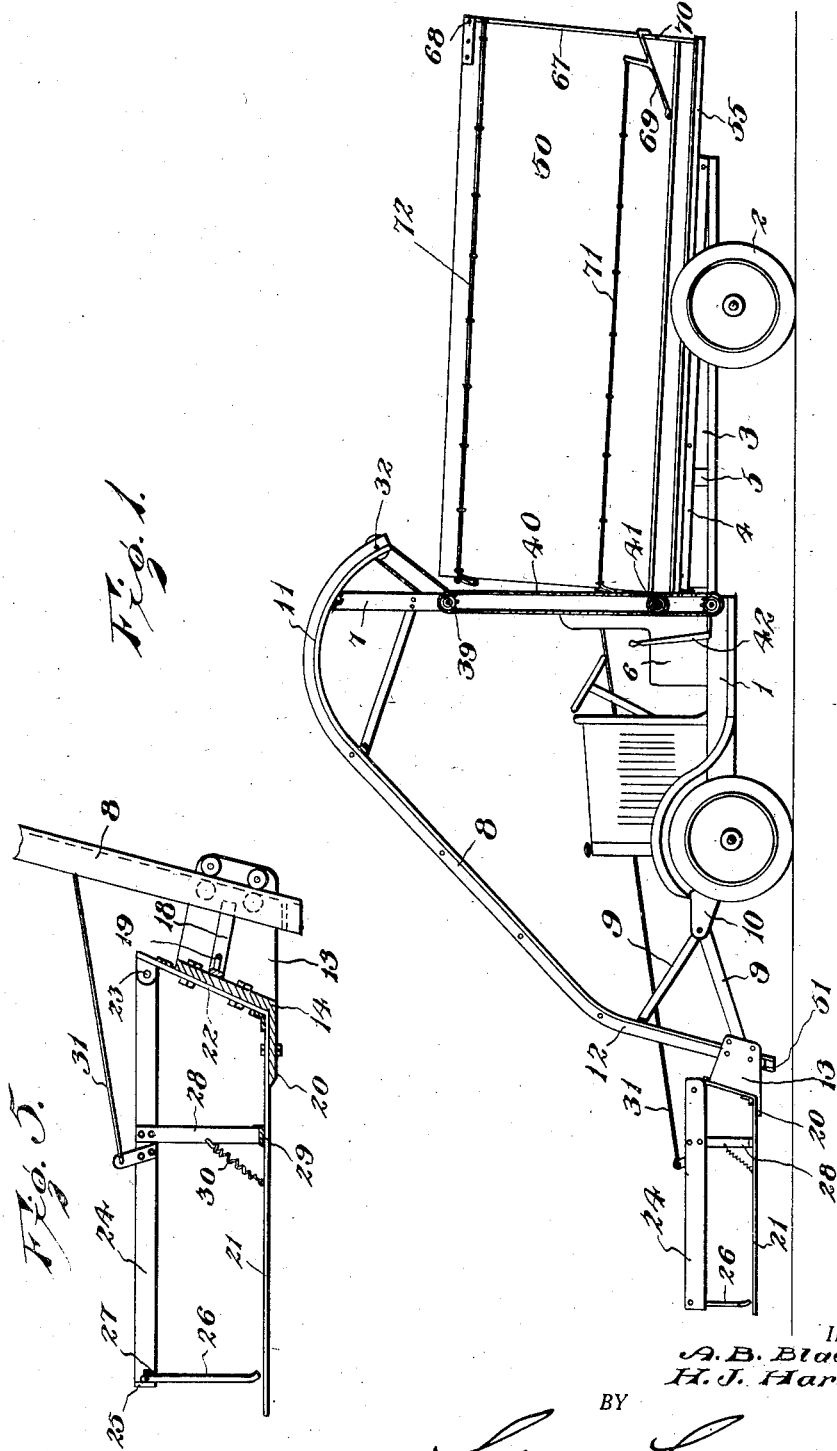

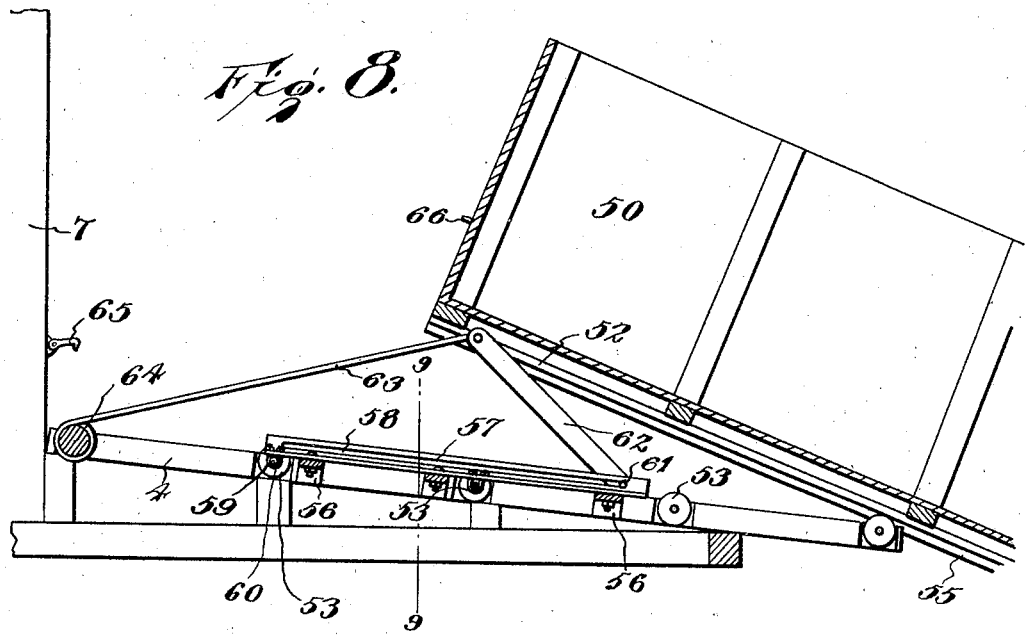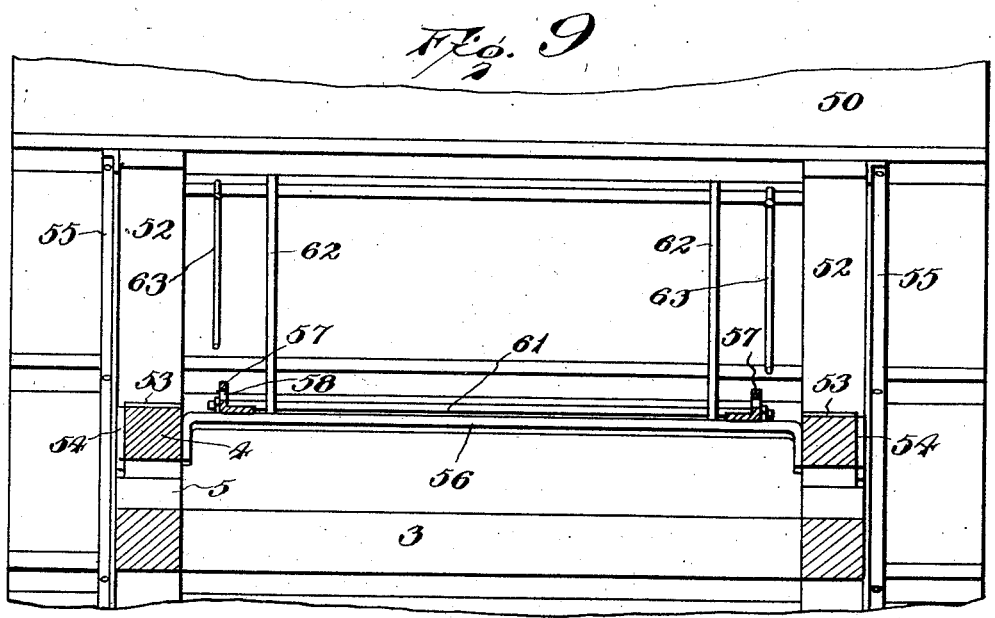

Patented July 22, 1930

1,771,285

UNITED STATES PATENT OFFICE

ALBERT B. BLACKWOOD AND HAROLD J. HARKNESS, OF LONG BEACH, CALIFORNIA

SHOCK LOADER

Application filed September 14, 1928. Serial No. 305,936.

Our invention relates to agricultural machinery and has for its object the provision of an apparatus which may be propelled over a field and mainpulated to take up a shock of grain and transfer the same to a vehicle body from which the accumulated shocks may be subsequently discharged for threshing, storage or other purposes. The invention seeks to provide an apparatus for the stated purpose which will be simple in construction and certain in its operation and which may be mounted upon a motor vehicle whereby the power of the vehicle may be utilized for operating the shock take-up and transfer mechanism. The invention is illustrated in the accompanying drawings and will be hereinfater full described, the novel features being particularly pointed out in the appended claims.

In the drawings:

Figure 1 is a side elevation of an apparatus embodying the invention;

Fig. 2 is a plan view of the same;

Fig. 3 is an enlarged detail perspective view of the upper end of the elevator track and the carrier dumping and retaining devices mounted thereon;

Fig. 4 is a transverse section through the parts shown in Fig. 3;

Fig. 5 is an enlarged sectional elevation of the carrier and shock take-up devices;

Fig. 6 is an enlarged transverse section of the carrier;

Fig. 7 is a detail bottom plan view of the same;

Fig. 8 is sectional elevation of the dumping box, and

Fig. 9 is an enlarged sectional elevation, the section being taken on the line 9—9 of Fig. 8.

In carrying out the invention, there is utilized a motor truck 1 which may be of any well known or approved construction. The rear wheels 2 of the truck form supports for a wagon-box-carrying frame 3 which has its front end secured to the chassis of the truck 1 and has its top members 4 inclined downwardly toward the rear. This supporting frame 3 may utilize the usual chassis of the truck by providing the frame 4 and supporting the same on the chassis through the medium of short posts 5, as will be understood.

Erected on the truck at the rear of the driver's seat, indicated at 6, and immediately adjacent the front end of the supporting frame 4 are standards 7 which, at their upper ends, form supports for track rails 8 extending downwardly and forwardly from the standards and having their lower ends supported from the front end of the truck through braces 9 and brackets 10, as will be understood upon reference to Fig. 1. The track rails 8 are preferably angle bars having their upper end portions curved, as shown at 11, whereby their extremities will be disposed at the rear of the standards 7 and immediately over the dumping box. The lower end portions of the track rails are preferably disposed more nearly vertical than the intermediate portions thereof, as shown at 12, so that the carrier and the basket which operate to take up the shock will be supported in proper position to ride easily under the bottom of the shock. The carrier consists of arms 13 which may be connected at their front or outer ends by a bridge 14 and on the inner opposed sides of said arms are mounted rollers 15 which are adapted to run upon the track rails 8, as shown most clearly in Fig. 6, it being noted that the lateral webs of the rails are directed outwardly and the rollers 15 are disposed, respectively, at the opposite faces of said webs. As shown most clearly in Fig. 3, the track rails are suitably reinforced by braces 16 throughout their length and at intervals along the rails rollers 17 are carried thereby for a purpose which will presently appear. Secured to the bridge member 14 of the carrier is a U-shaped guide 18, the ends of which are free and properly spaced to be disposed at the outer sides of the track rails, as shown in Fig. 6, whereby they will prevent excessive lateral movement of the carrier and will maintain the carrier in proper engagement with the rails. An eye 19 is also provided upon the bridging member 14 for a purpose which will hereinafter appear. The bridging member 14 is further preferably provided with a forwardly projecting shelf 20 and the basket or shock pick-up device is secured upon this shelf and the outer face of the bridging member, as shown in Figs. 1 and 5. The basket comprises a plurality of parallel forwardly projecting fingers 21 which may be of wood or other material as preferred and are of proper dimensions to support a shock of standard dimensions. The rear end portions of the fingers or take-up bars are bent upwardly, as shown at 22, to be rigidly secured to the bridge 14 of the carrier so that the basket will be firmly supported and will be caused to travel with the carrier. At the rear upper corners of the bars or fingers 21 are lugs 23 to which are pivoted the rear ends of side bars 24 which form the side members of a retainer which is adapted to fit around the shock taken up on the basket so as to prevent it falling therefrom during the transferring operation. The front ends of the side bars 24 are connected by a front bar 25 and pivoted to and extending between the side bars immediately adjacent said front bar is a gate 26 which will preferably consist of a plurality of depending light rods spaced apart and carried by a cross bar 27. The pivot of the gate is so disposed at the rear of the front bar 25 that the gate may readily swing rearward to clear a shock but cannot swing forward to release the shock after the shock has been taken up. At intermediate points in the lengths of the side bars 24, stop posts 28 are secured thereto, and these posts have their lower ends connected by a web 29 adapted to bear against the upper sides of the fingers 21 and thereby maintain the retainer in proper relation to the take-up fingers. Retractile springs 30 are attached to the posts 28 and the outermost fingers 21 so as to yieldably hold the retainer in its lowered position, and, to lift the retainer to permit a shock to be taken up, a cable 31 is attached to the side bar of the retainer and extends rearwardly therefrom to a point near the operator's seat 6 so that it may be easily manipulated. When a shock is to be taken up, the truck is driven so that the basket will be disposed immediately adjacent the lower end of the shock and the retainer and gate are then raised by pulling upon the cable 31, after which the truck is again driven forward so that the fingers 31 will pass under the shock, it being understood that these fingers are so disposed as to run close to the ground, although not in actual contact therewith so that, while they will readily pass below or through the bottom portion of a shock, they are not apt to be broken by contact with large rocks or other obstructions which may be lying upon the ground. After a shock has been taken up by the fingers 21, the retainer is lowered so that the side bars 24 and the cross bar 25 will pass around the side of the shock and the gate 26 will assume the pendent position shown in Figs. 1 and 5 to retain the shock in the basket.

At the upper extremities of the track rails 8 is journaled a transverse shaft 32, upon which are secured drums or windlasses 33 and a central sprocket 34, and attached to the drums so as to wind thereon are cables 35 which pass downwardly between the track rails and rest upon the rollers 17 and have their lower ends attached to the carrier 13 in any convenient manner, and it twill be seen at once that, when the cables are wound on the drums or windlasses, the carrier will be drawn upwardly along the track. To rotate the drums, a sprocket chain 36 is trained about the sprocket 34 and about a sprocket 37 secured upon a counter-shaft 38 which is journaled in the standards 7 below the upper ends of the same and is provided with a sprocket 39 on one end. A sprocket chain 40 is trained about the sprocket 39 and is also trained about a driving sprocket disposed at or near the lower end of the standard 7, as indicated at 41. This sprocket 41 is connected in any convenient manner with the power take-off shaft of the truck which may be connected with the transmission gearing of the truck and controlled by a lever 42 conveniently located near the operator's seat. It will be understood that the lever 42 is operable to close or open a clutch and when the clutch is closed the power of the truck engine will be transmitted to the sprocket 41 and thence to the drums or windlasses 33 so that the carrier will be drawn up along the track 8.

The upper arched portion of the track is bridged by a cover plate 43 so that the operator will be protected from dirt falling from the shock, and upon this plate 43 is mounted a slide 44 to which is attached one end of a contractile spring 45 which has its opposite end attached to the braces 16 below the lower edge of the cover plate 43. Studs or stop pins 46 are provided upon the cover 43 at the opposite limits of movement of the slide 44 and the slide is constructed with parallel longitudinal slots 47 through which headed studs 48 pass into the cover, these studs serving to retain the slide in contact with the cover and also cooperate with the studs or stop pins 46 to prevent excessive movement of the slide. On the upper side of the slide at the center thereof is a hook 49 which, in the operation of the apparatus, will be engaged by the eye 19 on the carrier so that, as the carrier nears the dumping position at the upper end of the track, the slide will move with the carrier and the tension upon the spring 45 will be thereby increased so that the resistance to the continued travel of the carrier will be correspondingly increased as the carrier moves over the upper arcuate portion of the tracks. The travel of the carrier will be arrested when the slide impinges against the rear stops 46 and as the carrier at this time will be beyond the peak of the arcuate portion of the track, the basket will be projecting upwardly and rearwardly so that the shock will at once fall therefrom into the dumping box 50

The shock having been thus discharged, the clutch of the operating gearing may be opened and the carrier will then return to its normal position at the lower end of the track through gravity. It will be understood that the engagement of the eye 19 with the hook 49 prevents the carrier passing beyond the track and as soon as the carrier has been relieved of the load imposed thereon by the shock, the spring 45 will retract and initiate the return movement of the carrier. By properly manipulating the clutch on the power take-off shaft, the descent of the carrier may be retarded so that breakage of parts will be avoided and to prevent the carrier passing off the tracks, stops, indicated at 51, of any approved form are provided adjacent the lower ends of the track.

The dumping box or bed 50 rests upon the frame 4 and is provided on its under side with shoes or runners 52 which rest directly upon the rollers 53 mounted in recesses provided therefor in the side rails of the frame 4 and held therein by cap plates 54. At the outer sides of the shoes or runners 52, guide rails 55 are provided on the under side of the box or bed 50 and said guide rails are disposed close to the sides of the frame 4 so that they will depend below the upper edges thereof and, consequently, will hold the box in proper position over the supporting frame. Cross bars 56 are secured to and extend between the sides of the frame 4, and these cross bars carry cleats 57 provided with longitudinal slots 58, the ends of the cleats being connected by clips, indicated at 59, with the cross rods 60 furnishing stationary axles for the adjacent rollers 53. A transverse rod 61 has its ends slidably fitted through the slots 58, and to this rod are secured the lower ends of links 62 which have their upper ends pivoted in any convenient manner to the under side of the box or bed 50. Cables 63 are attached to the bottom of the box 50 adjacent the front end thereof and extend forwardly therefrom to a windlass or drum 64 which is mounted in the front end of the frame 4 and may be rotated by a crank handle or by suitable gearing connected with the same shaft which operates the windlasses 33. When the cables 63 are fully wound upon the drum or windass 64, the wagon box 50 will occupy the position shown in Figs. 1 and 2 to receive the shocks and, if the cables be paid out, the box will be permitted to slide rearwardly and assume the dumping position shown in Fig. 8. To maintain the box normally in the position shown in Fig. 1, a hook 65 is provided upon one of the standards 7 to engage an eye 66 on the front end of the box, it being noted that this hook may be easily reached and released from the operator's seat. The dumping box is provided with a swinging end gate 67 which is pivotally supported at its upper ends, as indicated at 68, at the rear upper corners of the box and a pivoted latch 69 normally engages over a lug 70 on the end gate to hold the end gate closed. A cable 71 is attached to the latch and extends forwardly to the front end of the box while a second cable 72 is attached to the end gate and likewise extends to the front end of the box.

The box having been loaded, a pull is exerted upon the cable 71 to release the latch 69, whereupon the weight of the shocks bearing against the end gate will cause the latter to swing beyond the range of the latch. The hook 65 is then released, whereupon the inclined mounting of the box together with the load thereon will cause the same to slide rearwardly over the rollers 53 and when the center of the box has passed the end of frame 4 the box will swing, as indicated in Fig. 8 and discharge the load. When the box swings upwardly, the links 62 will also be moved upwardly to the position shown in Fig. 8, and as the rod 61 will then be at the rear ends of the slots 58, the box will be held against slipping from the supporting frame. After the shocks are discharged, the cables 63 are wound upon the windlass 64 and the box thereby drawn back to the position shown in Fig. 1, the rod 61 sliding forward in the slots 58 so that the links 62 will lie between the cleats 57 in an obvious manner. The cable 71 is then again pulled so as to raise the latch 69 and the cable 72 is pullled so as to swing the end gate 70 into its closed position, whereupon release of the cable 71 will permit the latch to again engage the end gate, thus restoring the parts to the initial position for another cycle of operations.

From the foregoing description, taken in connection with the accompanying drawings, it willl be seen that we have provided a very compact and efficient apparatus in which the parts are free of complicated arrangements and excessive weight is avoided. The apparatus will operate under light power and will gather the shocks expeditiously and without appreciable loss of grain.

Having thus described the invention, we claim:

1. Apparatus for the purpose set forth comprising a carrier, a basket secured to the carrier and comprising forwardly projecting fingers adapted to take up a shock, a retainer pivoted to the rear ends of the fingers and comprising side bars and a front cross bar adapted to pass around a shock on the fingers, a gravity-controlled gate pivotally mounted at the outer end of the retainer to swing rearwardly to clear a shock and prevented by the cross bar from swinging forwardly whereby to prevent release of the shock, means for swinging the retainer to permit a shock to be taken up by the fingers, and means for effecting travel of the carrier upwardly and rearwardly whereby to transfer the shock to a receptacle.

2. Apparatus for the purpose set forth comprising a carrier, a basket secured upon the carrier and comprising spaced forwardly projecting fingers adapted to take up a shock, and a retainer pivoted at the rear ends of the fingers and constructed to pass around a shock taken up by the fingers, yieldable connections between the carrier and the retainer holding the retainer normally lowered to the carrier, a gate hinged at the front end of the retainer to swing rearwardly over the fingers but held against movement forwardly beyond the fingers, means for lifting the retainer to permit a shock to be taken up, and means for effecting travel of the carrier upwardly and rearwardly to transfer the shock to a receptacle.

3. In apparatus for the purpose set forth, an upwardly and rearwardly extending track consisting of parallel rails having arcuate upper rear extremities, a cover plate secured to the bottoms of the rails at the arcuate extremities, a slide mounted on said plate between the rails, means for guiding the slide and limiting its movement, a retractile spring attached to the slide and to the track in advance of the slide, a hook on the slide, a carrier arranged to travel on the track, and an eye on the carrier in position to engage the hook on the slide whereby the carrier will be held to the track as it rides over the arcuate extremities of the rails.

In testimony whereof we affix our signatures.

ALBERT B. BLACKWOOD. [L. S.]
HAROLD J. HARKNESS. [L. S.]